United States Patent [19]

Botterman et al.

[11] Patent Number: 6,106,869
[45] Date of Patent: Aug. 22, 2000

[54] METHOD OF USING A TERRARIUM SUBSTRATE

[75] Inventors: Alan Mark Botterman; David Jack Hanono, both of Chula Vista, Calif.

[73] Assignee: T-Rex Products, Inc., Chula Vista, Calif.

[21] Appl. No.: 09/122,478

[22] Filed: Jul. 23, 1998

[51] Int. Cl.[7] .............................. A01K 3/30; A23K 1/175; A23K 1/18
[52] U.S. Cl. .................................. 426/2; 426/2; 426/74; 426/250; 426/805; 426/806; 426/648
[58] Field of Search ................................ 426/250, 74, 2, 426/805, 806, 648

[56] References Cited

U.S. PATENT DOCUMENTS

| | | | |
|---|---|---|---|
| 3,557,753 | 1/1971 | Dantoni | 119/2 |
| 3,804,064 | 4/1974 | Kuneman et al. | 119/5 |
| 4,022,879 | 5/1977 | Dietrich | 424/49 |
| 4,112,120 | 9/1978 | Smithers | 424/323 |
| 4,170,658 | 10/1979 | Skinner et al. | 119/430 |
| 4,362,748 | 12/1982 | Cox | 426/1 |
| 4,735,809 | 4/1988 | Donovan et al. | 426/69 |
| 4,782,135 | 11/1988 | Rinehart, Jr. | 424/121 |
| 4,794,022 | 12/1988 | Johnson et al. | 427/212 |
| 4,851,392 | 7/1989 | Shaw et al. | 524/53 |
| 5,151,416 | 9/1992 | DeLuca et al. | 514/167 |
| 5,169,682 | 12/1992 | Asai | 437/217 |
| 5,205,791 | 4/1993 | Pledger | 472/126 |
| 5,330,804 | 7/1994 | Allison et al. | 428/15 |
| 5,346,710 | 9/1994 | Geitner | 426/115 |
| 5,580,551 | 12/1996 | Reich et al. | 424/76.6 |
| 5,633,004 | 5/1997 | Nishimura et al. | 424/438 |
| 5,664,523 | 9/1997 | Ochi et al. | 119/173 |

*Primary Examiner*—Milton Cano
*Assistant Examiner*—Philip DuBois
*Attorney, Agent, or Firm*—Lyon & Lyon LLP

[57] ABSTRACT

The present invention involves an edible terrarium substrate for a terrarium animal such as a reptile, an amphibian, or an arachnid. The substrate includes a fine calciferous sand that is healthy, ingestible, and digestible by the terrarium animal.

7 Claims, No Drawings

METHOD OF USING A TERRARIUM SUBSTRATE

BACKGROUND OF THE INVENTION

1. Field of the Invention

This invention relates to terrarium substrates for terrarium animals such as reptiles, amphibians and arachnids.

2. Discussion of Related Art

Terrariums are used to house a wide variety of reptiles, amphibians, and arachnids. As used herein, terrarium generally refers to a cage, tank, or like container used as a vivarium to house one or more terrarium animals. A terrarium substrate, the floor covering used in terrariums, is an important part of an animal's habitat. Terrarium substrates can take a wide variety of different forms such as ground bark of fir trees, a fine sand, a litter material, moss, vermiculite, non-abrasive carpet, tile, flora, or any combination of the above.

A problem with some of these terrarium substrates, especially the fine sand substrates, is that the animal often consumes the substrate. Although substrates are usually non-toxic, they tend not to be digestible and are usually unhealthy if consumed by the animal.

A need therefore exists for an edible terrarium substrate, especially an edible terrarium substrate that is healthy for terrarium animals.

SUMMARY OF THE INVENTION

This need and others are addressed and solved by the present invention, an aspect of which includes the recognition that a need exists for a terrarium substrate that is edible and healthy for a terrarium animal, and that it would be beneficial for a terrarium animal to have some means for obtaining calcium that naturally simulates the means by which the animal would acquire calcium in the wild.

An additional aspect of the invention involves the novel use of calcium carbonate sand as an edible terrarium substrate for a terrarium animal.

A further aspect of the invention involves a method of manufacturing an edible terrarium substrate made of calciferous sand. The method includes the steps of providing calcium carbonate, grinding the calcium carbonate into a sand, and filtering the grounded sand. The method may also include the following steps in order to color the sand: heating the calcium carbonate sand, adding a food grade binder and food grade colorant to the sand, and mixing the food grade binder, food grade colorant and sand.

Other features and advantages of the invention are set forth in the following detailed description, which are intended to illustrate, but not limit, the invention.

DETAILED DESCRIPTION OF PREFERRED EMBODIMENT

A preferred embodiment of the invention will now be described. The present invention involves an edible terrarium substrate for one or more terrarium animals such as reptiles, amphibians, and arachnids. The edible terrarium substrate is made of a fine granular calciferous, i.e. calcium carbonate, sand. The calciferous sand is ingestible and digestible by the one or more terrarium animals. The fine nature of the calciferous sand facilitates ingestion and digestion of the calciferous sand, and eventual assimilation of calcium into the body. The calciferous sand is healthy for the terrarium animal and may eliminate the animal's need for commercially available calcium supplements.

The inventors of the present invention recognized that a need exists for a terrarium substrate that is edible and healthy for a terrarium animal, and that it would be beneficial for the method of assimilating calcium in the wild to be simulated as naturally as possible for a terrarium animal. It is this recognition that lead the inventors to the novel use of fine calciferous sand as an edible terrarium substrate for terrarium animals.

The calciferous sand preferably used as the edible terrarium substrate is a fine calciferous sand sold under the name XO White (00) screen controlled calcium carbonate filler sold by the Georgia Marble Company of Kennesaw, Ga., although other similar calciferous sands may be used.

This type of sand is widely used as a coarse aggregate filler for the development of a textured look in a variety of stucco applications for interior and exterior use. It is also used in water filtration and acid neutralization systems. Accordingly, an aspect of the present invention involves the novel use of this type of sand as an edible terrarium substrate for terrarium animals.

The calcium carbonate sand is approximately 95% calcium carbonate ($CaCO_3$), less than approximately 3% magnesium carbonate ($MgCO_3$), and less than approximately 3% other acid insolubles. The sand has a pH of approximately 9.0–9.5, a specific gravity of approximately 2.71, and a Moh's scale hardness of approximately 3.0.

Other properties of the calcium carbonate sand, making it ideal as a terrarium substrate, include the sand is a good conductor of heat, the sand clumps when exposed to liquid such as animal liquid waste, and the sand does not harbor insects and the growth of molds or fungus.

In accordance with another aspect of the invention, the fine calciferous sand is manufactured by grinding calcium carbonate into a sand, and then screening it to the following specifications: no more than 1% being retained on a U.S. #16 mesh screen and no more than 15% passing through a U.S. #40 screen. This sand is then brought into a coloring facility where all but 1% of the sand is retained on a U.S. #50 mesh screen.

Calcium carbonate sand is naturally white in color. Because other colors are also desirable for a terrarium substrate, an additional aspect of the present invention involves a method of coloring the fine calciferous sand. The fine calciferous sand is first heated in a rotary dryer at a temperature of approximately 250 degrees Fahrenheit. The calciferous sand is then immediately conveyed into a jacketed blender. Food grade colorants such as those sold by the Warner Jenkinson Company and a food grade binder are added to the calciferous sand in the blender. The colorants are brown, blue, green, black, and red. The decision of which colorants to add in the coloring process depends on the desired end color of the calcium carbonate substrate. The calciferous sand, food grade colorant, and food grade binder are mixed in approximately 4,000 lb. batches in the blender for approximately ten minutes. After the mixing process, the colored calciferous sand is till hot. Consequently, the sand is cooled by passing the color calciferous sand over a fluidized bed cooler. The cooled, colorized sand is then conveyed to a packaging machine for bagging the sand in 5 lb. and 25 lb. bags.

Although this invention has been described in terms of a preferred embodiment, other embodiments apparent to those of ordinary skill in the art are also within the scope of this invention. Accordingly, the scope of this invention is intended to be defined only by the claims that follow.

What is claimed is:

1. A method of use of calcium carbonate as an edible terrarium substrate in a terrarium including a terrarium animal, comprising:

providing calcium carbonate sand; and using the calcium carbonate sand as a floor covering for an animal terrarium, whereby the calcium carbonate sand is healthy, ingestible, and digestible by the terrarium animal.

2. The method of claim 1, wherein the sand is a fine granular sand.

3. The method of claim 2, wherein the sand is a screen controlled calcium carbonate filler.

4. The method of claim 1, wherein the sand is approximately 95% calcium carbonate, no greater than approximately 3% magnesium carbonate, and not more than approximately 5% other acid insolubles.

5. The method of claim 1, wherein the sand has a pH of approximately 9.0–9.5.

6. The method of claim 1, wherein the sand has a specific gravity of approximately 2.71.

7. The method of claim 1, wherein the sand has a Moh's scale hardness of approximately 3.0.

* * * * *